United States Patent [19]

Kato et al.

[11] 4,285,636
[45] Aug. 25, 1981

[54] VERTICAL AXIS TYPE WIND POWER TURBINE

[75] Inventors: Yoshio Kato, Tokyo; Kazuichi Seki, Isehara; Yoshio Shimizu, Kanagawa, all of Japan

[73] Assignee: Gakko Hojin Tokai University, Tokyo, Japan

[21] Appl. No.: 878,769

[22] Filed: Feb. 17, 1978

[30] Foreign Application Priority Data

Feb. 19, 1977 [JP] Japan ................................. 52/17525
Feb. 19, 1977 [JP] Japan ............................ 52/19704[U]

[51] Int. Cl.³ ............................................. F03D 3/06
[52] U.S. Cl. ................................. 416/197 A; 416/242; 416/119
[58] Field of Search .................. 416/119, 111, 197 A, 416/242

[56] References Cited

U.S. PATENT DOCUMENTS

| | | | |
|---|---|---|---|
| 1,467,699 | 9/1923 | Vinding et al. | 416/242 X |
| 1,835,018 | 12/1931 | Darrieus | 416/119 |
| 1,953,444 | 4/1934 | Stalker | 416/119 X |
| 2,023,750 | 12/1935 | Strandgren | 416/119 |
| 4,012,163 | 3/1977 | Baumgartner et al. | 416/197 A X |

FOREIGN PATENT DOCUMENTS

| | | | |
|---|---|---|---|
| 456963 | 5/1949 | Canada | 416/242 |
| 860930 | 12/1952 | Fed. Rep. of Germany | 416/119 |
| 892130 | 10/1953 | Fed. Rep. of Germany | 416/202 |
| 2051579 | 4/1972 | Fed. Rep. of Germany | 416/119 |
| 929721 | 1/1948 | France | 416/52 |
| 1098995 | 8/1955 | France | 416/197 A |
| 2291379 | 6/1976 | France | 416/119 |
| 2298707 | 8/1976 | France | 416/197A |

*Primary Examiner*—Everette A. Powell, Jr.
*Attorney, Agent, or Firm*—Koda and Androlia

[57] ABSTRACT

Wind power turbines are largely divided into vertical axis type wind power turbines and propeller type (horizontal axis type) wind power turbines. The present invention discloses a vertical axis type wind power turbine. The airfoil of blades in this vertical axis type wind power turbine is formed in such manner that, denoting a proper position on the airfoil chord line as a camber reversing position, a camber having a downward convex curvature is given between said position and a leading edge and a camber having an upward convex curvature is given between said position and a trailing edge so as to be a mean line and a rational thickness distribution is given to this mean line. This vertical axis type wind power turbine is formed by keeping the spanwise direction of the above mentioned blade parallel with a vertical rotary axis and fitting a plurality of blades at regular intervals at a distance to the vertical rotary axis through respective supporting arms.

6 Claims, 8 Drawing Figures

VERTICAL AXIS TYPE WIND POWER TURBINE

BACKGROUND OF THE INVENTION

This invention relates to wind power turbines and more particularly to a vertical axis type wind power turbine.

Generally, various wind power turbines converting a wind power energy to a rotary motion have been already suggested and practiced. Such wind power turbines are largely divided into propeller type (horizontal axis type) wind power turbines and vertical axis type wind power turbines. In the propeller type wind power turbine among them, unless the propeller rotating disk is rightly aligned with the wind direction, the rotating efficiently will be so low that, in case the wind power turbine is to be located in a place where the wind direction varies, it will be necessary to always rightly align the propeller rotating disk with the wind direction by providing a device following the wind direction. On the other hand, the vertical axis type wind power turbine is omni-directional and is not influenced at all by the wind direction. Therefore, the primary advantage of the vertical axis wind turbine over its horizontal counterpart lies in the simplicity of the basic configuration.

However, if such airfoil as is usually used for aircraft is adopted for the blade of the above mentioned vertical axis type wind power turbine, the efficiency of the turbine will not be so high as it potentially is. Therefore, a system of periodically controlling the blade fitting angle with the rotation of the turbine is suggested to improve the efficiency of the wind power turbine. However, in this cyclic control system, a complicated costly control device is required to be introduced and the feature of the above described vertical axis type windmill can not be well realized.

SUMMARY OF THE INVENTION

An object of the present invention is to provide a vertical axis type wind power turbine wherein no complicated control system is required to be introduced into the wind power turbine or blades and the blades with an airfoil by which a favorable rotating efficiency is obtained are employed.

Another object of the present invention is to provide a vertical axis type wind power turbine wherein the natural frequency of the spanwise bending vibration of the blade can be increased.

A further object of the present invention is to provide a vertical axis type wind power turbine wherein the natural frequency of the bending vibration of the vertical rotary axis can be kept high.

A still further object of the present invention is to provide a vertical axis type wind power turbine wherein the vibration and deflection induced by the rotation of the turbine can be prevented and the wind power can be comparatively efficiently converted.

A still more further object of the present invention is to provide a vertical axis type wind power turbine wherein the induced drag on the blade is reduced by preventing the reduction of the lift coefficient so as to make the aerodynamic characteristics of the blade approach those of a two-dimensional blade and therefore the efficiency is improved.

Further objects, features and advantages of the present invention will be apparent from the following description.

DETAILED DESCRIPTION OF THE INVENTION

An embodiment of the blade to be used for the vertical axis type wind power turbine of the present invention shall be explained in the following with reference to FIGS. 1 and 2.

Figure 1:
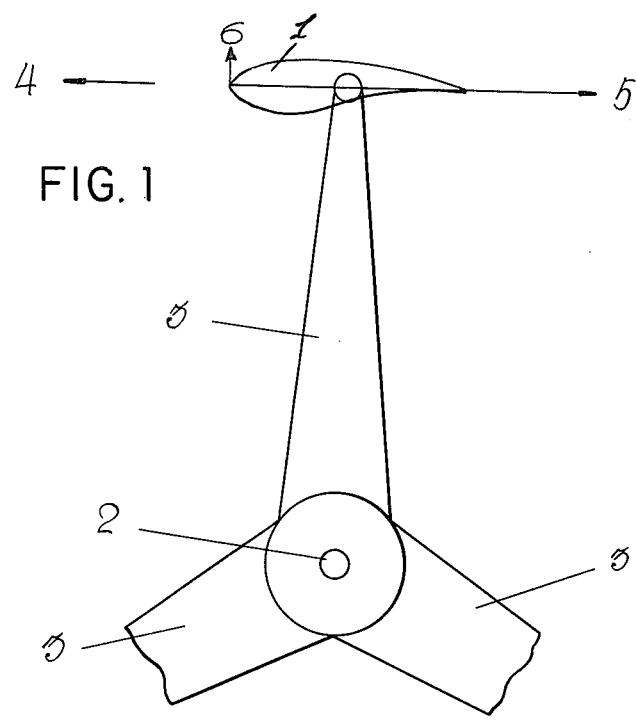
FIG. 1 is an explanatory plan view showing a blade to be used in the present invention as fitted to a vertical axis type wind power turbine.

A blade 1 is fitted and fixed as shown in FIG. 1 to the ends of supporting arms 3 fitted above and below a vertical rotary axis 2 and projecting radially therefrom.

In FIG. 1, reference numeral 4 indicates an arrow showing the advancing direction of the blade and 5 and 6 indicate arrows showing respectively the positive direction on the coordinate X and the positive direction on the coordinate Y.

Figure 2:
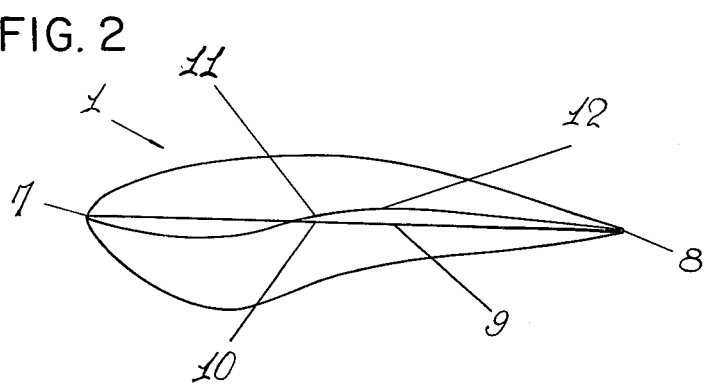
FIG. 2 is an explanatory view showing an embodiment of the airfoil of a blade to be used in the present invention.

In FIG. 2 showing the airfoil of the blade 1, reference numeral 7 indicates the leading edge of the airfoil, 8 indicates the trailing edge of the airfoil, 9 indicates the chord line of the airfoil, 10 indicates a camber reversing point and 11 indicates a camber reversing position which is a projection on the coordinate X of the camber reversing point 10. The above mentioned airfoil 1 is formed by giving a camber of a downward convex curvature between the leading edge 7 of the airfoil and the camber reversing position 11 and a camber of an upward convex curvature between the camber reversing position 11 and the trailing edge 8 of the airfoil so as to be a mean line 12 and giving a reasonable thickness distribution to this mean line.

The airfoil 1 of the vertical axis type turbine operates in a wide angle of attack during the rotation of the turbine and therefore the degree to which various characteristics of the airfoil contribute to the rotating efficiency of the turbine is complicated. However, the inventors of the present invention have discovered that the following three characteristics are desired for the airfoil 1 of the vertical axis type wind power turbine.

One of the characteristics is that the pitching moment coefficient should have a large negative value. For this purpose, in the blade 1 of the present invention, the above mentioned characteristic is obtained by reversing the camber curvature. By the way, the above mentioned characteristic does not coincide with the characteristic of the airfoil to be used usually for aircraft, because, in the airfoil for aircraft, it is customary to keep the pitching moment coefficient as small as possible.

The second of the desired characteristics is that the minimum drag coefficient should be small. For this purpose, in the airfoil of the blade 1 of the present invention, a reasonable blade thickness distribution is given to the mean line made by reversing the camber.

The third of the desired characteristics is that the difference between the zero lift angle and minimum drag coefficient angle should be small. For this purpose, the airfoil of the present invention has also this characteristic by reversing the camber as described above.

The vertical axis type wind power turbine formed by using blades of the above mentioned airfoil shall be explained in the following.

Figure 3:
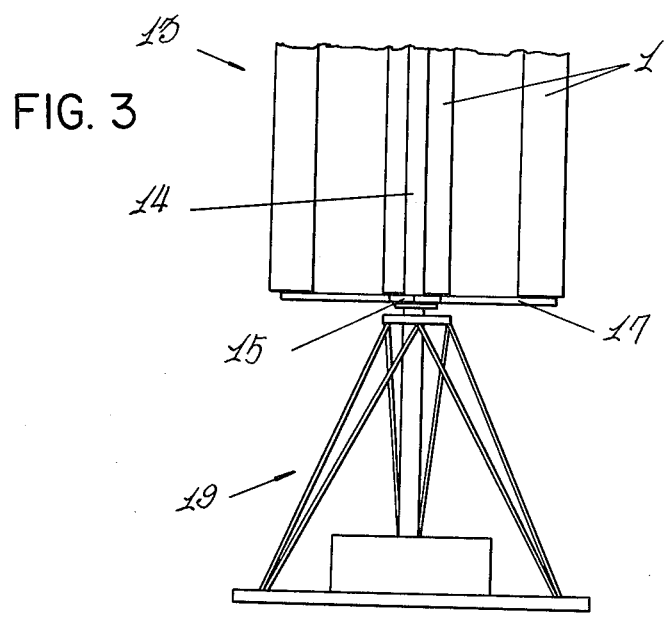
FIG. 3 is an elevation showing a vertical axis type wind power turbine of the first embodiment of the present invention.
Figure 4:
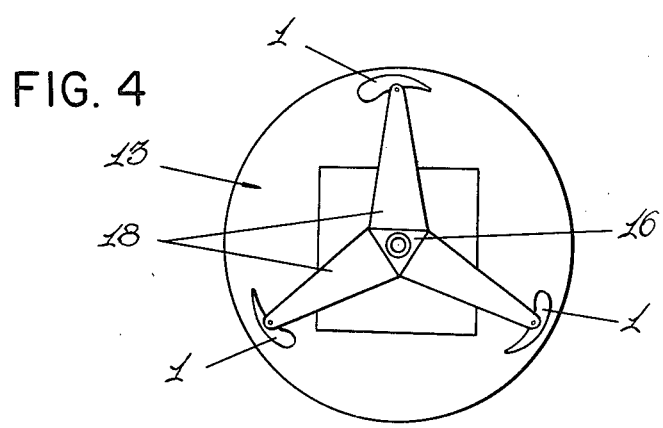
FIG. 4 is a plan view of FIG. 3.

The vertical axis type wind power turbine shown in FIGS. 3 and 4 is a turbine of the first embodiment of the present invention. This wind power turbine 13 is formed by fitting and fixing the above described blades at their upper and lower ends respectively to the ends of supporting arms 17 and 18 provided to project at regular intervals radially from two upper and lower flanges 16 and 15 fixed to a vertical rotary axis 14.

By the way, in the drawing, reference numeral 19 indicates a turbine supporting stand rotatably holding the above mentioned turbine.

Generally the aerodynamic force received by the vertical axis turbine fluctuates with the rotation of the turbine and becomes a periodic exciting force to vibrate the turbine. However, the basic frequency of such exciting force is obtained by multiplying the number of revolutions of the turbine by the number of blades. Therefore, in a high speed type turbine with a high efficiency of conversion, particularly it is necessary to keep the natural frequencies of the respective component elements of the turbine high.

In the turbine of the above mentioned first embodiment, the blade is held at its upper and lower ends.

Figure 5:
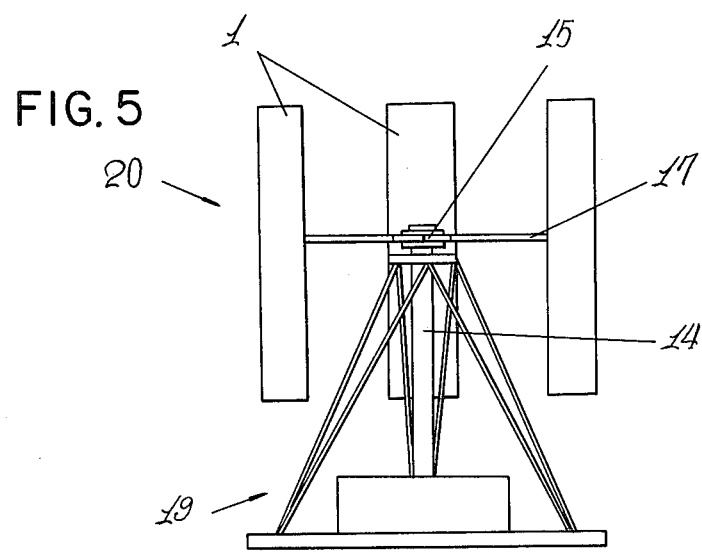
FIG. 5 is an elevation showing a vertical axis type wind power turbine of the second embodiment of the present invention.

The vertical axis type wind power turbine shown in FIG. 5 is a turbine of the second embodiment of the present invention.

This vertical axis type wind power turbine 20 is formed by fixing a flange 15 to a vertical rotary axis 14 just above the supporting stand 19 and fitting and fixing the above described blades 1 substantially in the center parts to the ends of the respective supporting arms 17 provided to project at regular intervals radially from this flange 15. In the turbine of this second embodiment, the distance between the upper end of the supporting stand 19 and the supporting arm 17 is so small that the natural frequency of the bending vibration of the axis 14 can be kept high.

Figure 6:
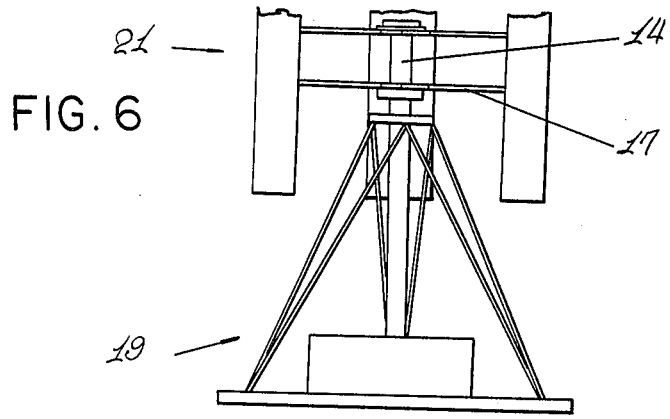
FIG. 6 is an elevation showing a vertical axis type wind power turbine of the third embodiment of the present invention.

The wind power turbine shown in FIG. 6 is a turbine of the third embodiment of the present invention. This vertical axis type wind power turbine 21 is of a type intermediate between the types of the turbines of the above mentioned first embodiment and second embodiment. The fitting positions of the blades 1 are made intermidiate so that the vibration and deflection induced by the rotation of the turbine may be prevented and the wind power may be comparatively efficiently converted.

Figure 7:
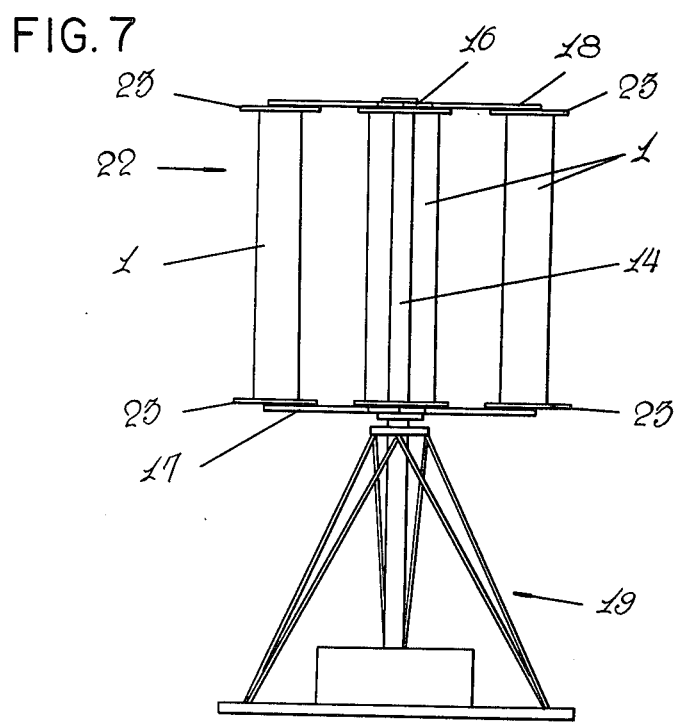
FIG. 7 is an elevation showing a vertical axis type wind power turbine of the fourth embodiment of the present invention.
Figure 8:
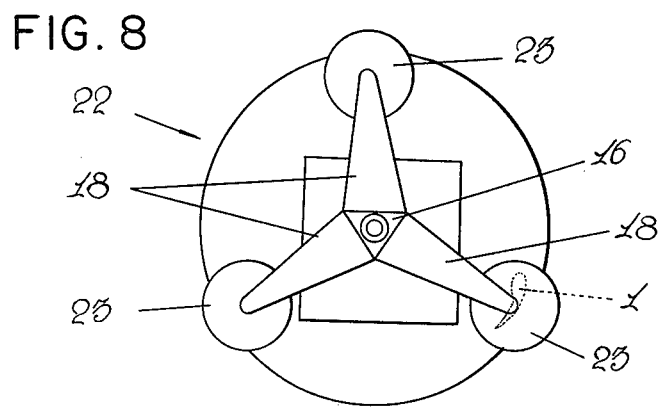
FIG. 8 is a plan view of FIG. 7.

Shown in FIGS. 7 and 8 is a vertical axis type wind power turbine 22 of the fourth embodiment of the present invention. In this embodiment, horizontal blade end plates 23 are provided respectively at the upper and lower ends of the blades 1. Due to the presence of these blade end plates 23, the induced drag generated by the three-dimensional effect of the blades 1 will be reduced and the efficiency of the turbine 22 will be further improved. That is to say, these blade end plates 23 will reduce the induced drag by preventing the reduction of the lift coefficient so as to make the aerodynamic characteristics of the blade approach those of the two-dimensional blade.

Obviously the embodiment shown in FIGS. 7 and 8 is used for the vertical axis type wind power turbine of the first embodiment of the present invention but, needless to say, can be naturally used also for the wind power turbines of the second and third embodiments.

In the vertical axis type wind power turbine of the present invention, the number of blades is not limited to three as in each embodiment. It is desirable to have a reasonable number of blades depending on the site and meteorological conditions.

It is obvious that different embodiments can be formed in a wide range without deviating from the spirit and scope of the present invention. This invention is not limited to the specific embodiments except being limited in the appended claims.

We claim:

1. A vertical axis type wind powered turbine comprising a plurality of vertical blades of an airfoil form, each of said blades comprising a leading edge, a trailing edge, a cord line extending between said leading and said trailing edge and a mean camber line reversing position provided on said chord line between said leading and trailing edges, each of said blades further having a mean camber line having a radially inward curved convex curvature between said position and said leading edge and a mean camber line having a radially outward convex curvature between said position and said trailing edge and a rational thickness distribution is given to said mean camber line.

2. A vertical axis type wind power turbine comprising a plurality of blades of an airfoil form, each of said blades comprising a leading edge, a trailing edge, a cord line extending between said leading edge and said trailing edge and a mean camber line reversing position provided on said chord line between said leading and trailing edges, each of said blades further having a mean camber line having a radially inward convex curvature between said position and said leading edge and a mean camber line having a radially outward convex curvature between said position and said trailing edge and a rational thickness distribution is given to said mean camber line; a support having a vertical rotary axis provided parallel with a spanwise direction of said blades; and a plurality of supporting arms rotatably coupled to said rotary axis and respectively fitting and fixing a plurality of said blades at a distance to said vertical axis.

3. A vertical rotary axis type wind power turbine according to claim 2 characterized in that said supporting arms support the blades at their upper and lower ends.

4. A vertical axis type wind power turbine according to claim 2 characterized in that said supporting arms support the blades substantially at their centers.

5. A vertical rotary axis type wind power turbine according to claim 2 characterized in that said supporting arms support the blades above and below that midspan position.

6. A vertical rotary axis type wind power turbine according to claim 2 characterized in that horizontal blade end plates are provided respectively at the upper and lower ends of the blades.

* * * * *